US011748095B2

(12) United States Patent
Bhalla et al.

(10) Patent No.: US 11,748,095 B2
(45) Date of Patent: *Sep. 5, 2023

(54) AUTOMATION OF TASK IDENTIFICATION IN A SOFTWARE LIFECYCLE

(71) Applicant: Security Compass Technologies Ltd., Toronto (CA)

(72) Inventors: Nishchal Bhalla, Toronto (CA); Rohit Kumar Sethi, Toronto (CA); Ramanan Sivaranjan, Toronto (CA); Ehsan Foroughi, Toronto (CA); Geoffrey Charles Whittington, Toronto (CA)

(73) Assignee: Security Compass Technologies Ltd., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/825,097

(22) Filed: May 26, 2022

(65) Prior Publication Data

US 2022/0283802 A1 Sep. 8, 2022

Related U.S. Application Data

(63) Continuation of application No. 16/686,252, filed on Nov. 18, 2019, now Pat. No. 11,379,219.

(Continued)

(51) Int. Cl.
*G06F 8/71* (2018.01)
*G06F 21/57* (2013.01)
(Continued)

(52) U.S. Cl.
CPC .................. *G06F 8/71* (2013.01); *G06F 8/75* (2013.01); *G06F 21/563* (2013.01);
(Continued)

(58) Field of Classification Search
CPC . G06F 8/71; G06F 8/75; G06F 21/563; G06F 21/577; G06F 2221/033; G06N 5/02; G06N 5/022; G06Q 10/06313
See application file for complete search history.

(56) References Cited

U.S. PATENT DOCUMENTS

| 2009/0083695 A1 | 3/2009 | Mir et al. | |
| 2014/0201703 A1* | 7/2014 | Boden | G06F 8/70 717/101 |

FOREIGN PATENT DOCUMENTS

WO 2017134665 8/2017

OTHER PUBLICATIONS

Alnusair, Awny, and Tian Zhao. "Retrieving reusable software components using enhanced representation of domain knowledge." Recent Trends in Information Reuse and Integration. Vienna: Springer Vienna, 2011. 363-379. (Year: 2011).*

(Continued)

*Primary Examiner* — Kevin L Young
*Assistant Examiner* — Joanne G Macasiano

(57) ABSTRACT

A system and method for automation of task identification and control in a software lifecycle. Software context for a software asset is extracted from context repositories of the software asset during software development and operation, the extracted context data is matched to relevant tasks in a knowledge database to select tasks for the software asset, and task prioritization and orchestration are presented in a prioritized task list during a software lifecycle.

20 Claims, 7 Drawing Sheets

Related U.S. Application Data

(60) Provisional application No. 62/769,091, filed on Nov. 19, 2018.

(51) Int. Cl.
    *G06N 5/02*     (2023.01)
    *G06Q 10/0631*     (2023.01)
    *G06F 8/75*     (2018.01)
    *G06N 5/022*     (2023.01)
    *G06F 21/56*     (2013.01)

(52) U.S. Cl.
    CPC ............ *G06F 21/577* (2013.01); *G06N 5/02* (2013.01); *G06N 5/022* (2013.01); *G06Q 10/06313* (2013.01); *G06F 2221/033* (2013.01)

(56) References Cited

OTHER PUBLICATIONS

Cadariu Mircea et al. "Tracking known security vulnerabilities in proprietary software systems", 2015 IEEE 22nd International Conference On Software Analysis, Evolution, and Reengineering (SANER), IEEE, Mar. 2, 2015, pp. 516-519.

\* cited by examiner

AUTOMATION OF TASK IDENTIFICATION IN A SOFTWARE LIFECYCLE

CROSS-REFERENCE TO RELATED APPLICATIONS

This application claims priority to U.S. provisional patent application US62/769,091 filed 19 Nov. 2019, and is a continuation of U.S. patent application Ser. No. 16/686,252, both of which are hereby incorporated by reference herein in their entirety.

FIELD OF THE INVENTION

The present invention pertains to a system and method for automation of task identification and control in a software lifecycle environment. In particular, the present system and method is for automating the identification of software context during development and operation, and task prioritization and orchestration during a software lifecycle.

BACKGROUND

The Software Development Life Cycle (SDLC) process is a process for planning, creating, testing, and deploying an information system or software asset throughout the life cycle of the software asset. SDLC comprises investigation, analysis, design, implementation and maintenance from cradle to grave of a software asset. Development of new software often involves incorporating existing code, libraries, and existing network architecture, each of which come with their own set of vulnerabilities, some of which are known and others of which unknown or not yet identified. Identifying the required features and security requirements for any given piece of software and ensuring that developers properly address each requirement during the software lifecycle is a complex task often mediated by a multitude of standalone application lifecycle management (ALM) and project management tools.

With the ever-changing electronic security landscape, software requires constant updating to reduce security risks and prevent breaches. With software integration to a plurality of internal and external resources, identification of requirements for the duration of the software lifecycle is an onerous task, and keeping abreast of requirements, vulnerabilities, updates, and breaches can also be onerous during the software development and maintenance lifecycle. Software analysts, developers, and testers can be overwhelmed with the amount of available information and variety of tools they can employ, be required to consider long lists of task requirements, guidelines, and standards, and be required to provide tangible and auditable evidence that software products comply with requirements. Externally linked libraries, resources, and scripts incorporated into a software asset can also be dynamic and automatically distributed such that updates and breaches may not be immediately brought to the attention of developers. Human error in inadvertent omission of a requirement or insufficient verification can also introduce vulnerabilities into the software asset.

Despite known software vulnerabilities being public knowledge to both developers and hackers, software developers often lack relevant, timely, and context specific tools and guidance to help them build and maintain secure software. Many tools focus only on detecting particular vulnerabilities in the source code of a piece of software and are designed to analyze source code and/or compiled versions of code to help find security flaws. However fixing a vulnerability after coding is costly and often difficult, and identification and prioritization of tasks from externally sourced resources can be challenging to developers. Large repositories of security and regulatory information can be difficult to navigate, are not tailored to a specific application environment, and are often not subject to commercial grade quality controls. Having multiple large and evolving repositories of requirements also requires developers not only to identify any and all requirements pertaining to a particular application, but to keep up to date with new information and requirements.

Some attempts have been made to determine defect risks in software solutions during development. U.S. Pat. No. 9,558,464 to Bassin et al. teaches a system and method for receiving one or more risk factors, receiving one or more contexts, identifying one or more context relationships and associating the one or more contexts with the one or more risk factors, where the one or more risk factors map an associated context to a software defect related risk consequence to determine a risk model. Risk-based testing is then executed based on the risk model to determine a defect related risk evaluation for a software development project.

Other tools have attempted to solve software security problems by providing tools such as software static analysis and run-time testing applications. United States patent application 2012/0254829 to Bhalla et al. describes a method of providing security guidance in writing software assets including activating a guidance application linked to a computer and a database of security features, the guidance application being operable to present a user with suggestive security content in writing software assets.

There remains a need for automated extraction of task and security requirements for a software asset based on software context to automate task identification in a software lifecycle.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a system and method for automated extraction of task and security requirements for a software asset based on software project context to guide software development and to identify security requirements of the software asset that should be addressed throughout the software lifecycle.

In one aspect, there is provided a method for automation of task identification for a software asset, the method comprising: extracting context data from a context repository of the software asset, the context data relevant to the software asset; matching the extracted context data to relevant tasks in a knowledge database to select tasks for the software asset; generating a prioritized task list comprising the selected tasks for the software asset; and updating the prioritized task list throughout the software lifecycle when updates are made to the context repository or knowledge database that are relevant to the software asset.

In an embodiment of the method, the task requirements comprise security requirements.

In another embodiment, the context data comprises source code and natural language.

In another embodiment, the context repository is at least one of a system of record, source code repository, and epic repository.

In another embodiment, the method comprises scanning a plurality of context repositories.

In another embodiment, the extracting content data from the content repository comprises performing natural language processing on at least one context repository.

In another embodiment, the method further comprises performing a meta analysis on source code of the software asset.

In another embodiment, the method further comprises scanning source code of the software asset using a code scanner to identify any code vulnerabilities.

In another embodiment, the method is performed by more than one computing device.

In another embodiment, context data is extracted from the context repository with natural language processing of the context repository.

In another embodiment, the context repository is a management system selected from a dependency management system, a source code management repository, an application lifecycle management repository, and a configuration management repository.

In another embodiment, the method further comprises costing a software development project by calculating resources required to address each task in the prioritized task list.

In another aspect there is provided a system for automation of task identification in a software asset lifecycle comprising: a context repository comprising context data for the software asset; a context extraction engine for extracting the context data from the context repository; a context database for storing extracted context data; a knowledge database for storing task requirements; a selection module for selecting tasks relevant to the software asset from the knowledge database based on the context data; and a prioritization engine for prioritizing the selected tasks.

In an embodiment, the task requirements are security task requirements.

In another embodiment, the context extraction engine comprises a code scanner.

In another embodiment, the context extraction engine comprises a natural language processor.

In another embodiment, the context repository is a management system.

In another embodiment, the management system is selected from a dependency management system, a source code management repository, an application lifecycle management repository, and a configuration management repository.

In another aspect there is provided a method for orchestrating a set of automated and manual tasks in a software development lifecycle for a software asset, the method comprising: extracting context data from a context repository, the context data relevant to the software asset; matching extracted context data to relevant tasks in a knowledge database to select tasks for the software asset; generating a prioritized task list comprising the selected tasks for the software asset; assigning each task in the prioritized task list as a machine addressable task or a task requiring human intervention; directing machine-addressable tasks to a machine asset; directing tasks requiring human intervention to a developer task list; and updating the prioritized task list throughout the software lifecycle when updates are made to the context repository or knowledge database that are relevant to the software asset.

In another aspect there is provided a computerized system for automation of task identification for a software asset from context data of the software asset, the system comprising: a computer system comprising at least one processor, at least one memory device, and at least one network communication device; and a context extraction engine stored in the at least one memory device comprising computer readable instructions, that when executed by the at least one processor cause the at least one processor to: extract context data from at least one context repository of the software asset, the context data relevant to the software asset; match the extracted context data to relevant tasks in a knowledge database to select relevant tasks for the software asset; generate a prioritized task list comprising the selected tasks for the software asset; and update the prioritized task list throughout the software lifecycle when updates are made to the context repository or knowledge database that are relevant to the software asset.

BRIEF DESCRIPTION OF THE FIGURES

For a better understanding of the present invention, as well as other aspects and further features thereof, reference is made to the following description which is to be used in conjunction with the accompanying drawings, where.

DETAILED DESCRIPTION OF THE INVENTION

Figure 1:
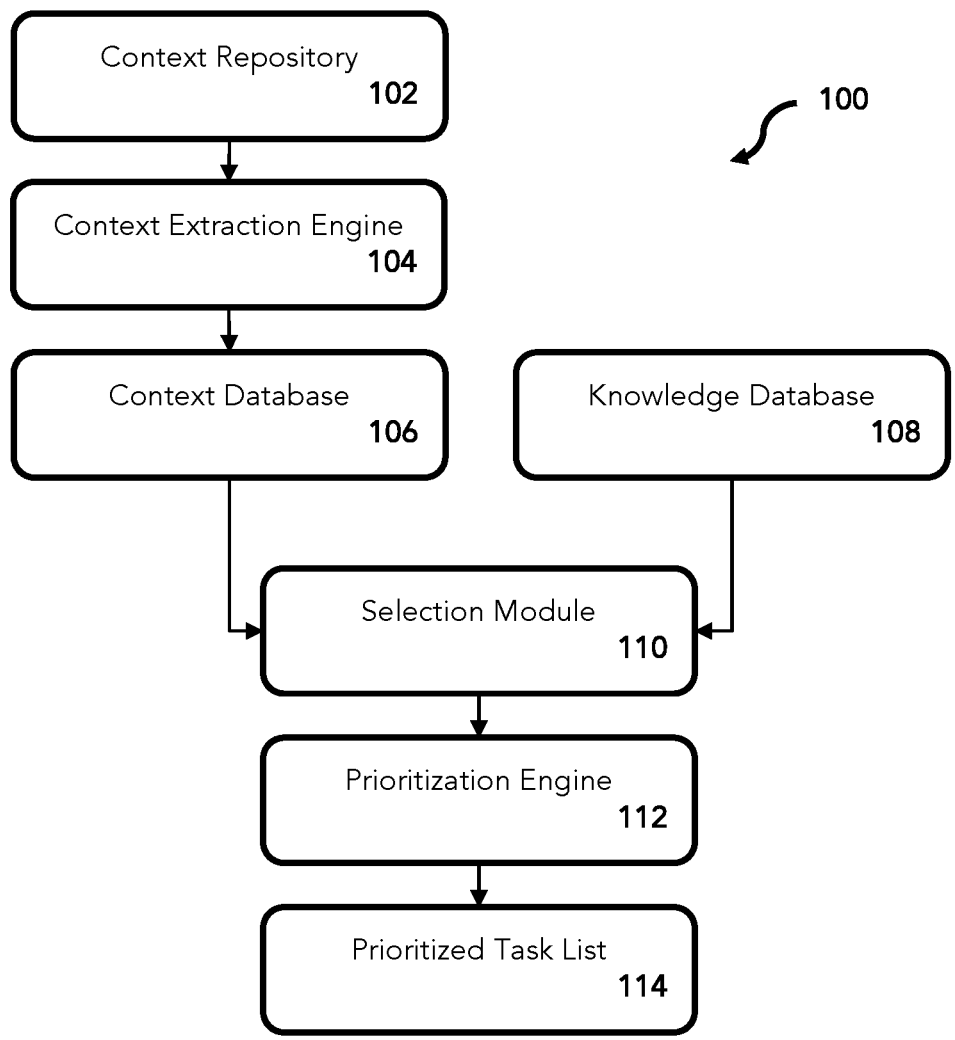
FIG. 1 illustrates a system for generating a prioritised task list by extracting software context from a context repository.

Unless defined otherwise, all technical and scientific terms used herein have the same meaning as commonly understood by one of ordinary skill in the art to which this invention belongs.

As used in the specification and claims, the singular forms "a", "an", and "the" include plural references unless the context clearly dictates otherwise.

The term "comprising" as used herein will be understood to mean that the list following is non-exhaustive and may or may not include any other additional suitable items, for example one or more further feature(s), component(s) and/or element(s) as appropriate.

The term "developer" as used herein refers to anyone involved in the development, maintenance, testing, and/or regulatory aspects of a software asset at any point throughout the software development lifecycle. Non-limiting examples of developers include software developers, requirements analysts, programmers, testers, project leaders, auditors, regulatory advisors, and security analysts.

The term "weakness" as used herein refers to a general security liability that can occur in a piece of software that can potentially allow an attacker and/or disruptive code or action to interfere with or breach the software. A weakness can be a consequence of, for example, a system susceptibility or flaw, attacker access to the flaw, attacker capability to exploit the flaw, susceptibility to unauthorized addition of code, susceptibility to software disruption, or a combination thereof.

The term "vulnerability" as used herein refers to a particular occurrence of a weakness in a piece of software, either in the code or in the application of the code, and that presents a security risk to the particular piece of software.

The term "software asset" refers to any software intensive system that enables or performs computations. Examples of software assets include but are not limited to a programming language, source code, software application, database, operating system, desktop computer, server, or hardware computing or communication device.

The term "task" refers to any control or requirement for the purpose of compliance, obtaining a functionality, or addressing a risk. The requirement can be a non-functional requirement (NFR) for a system or software being designed or developed, and/or a requirement that specifies criteria that can be used to judge the operation and/or risk of a system. Non-limiting examples of non-functional requirements include accessibility, adaptability, auditability, availability, capacity, certification, compatibility, configuration management, data integrity, data retention, dependency, deployment, development environment, disaster recovery, documentation, durability, efficiency (resource consumption for given load), exploitability, extensibility, failure management, fault tolerance (e.g. operational system monitoring, measuring, and management), legal and licensing issues or patent-infringement-avoidability, interoperability, maintainability (e.g. mean time to repair—MTTR), management, modifiability, network topology, operability, performance and/or response time (performance engineering), platform compatibility, privacy (compliance to privacy laws), portability, quality (e.g. faults discovered, faults delivered, fault removal efficacy), readability, reliability (e.g. mean time between/to failures—MTBF/MTTF), resilience, resource constraints (processor speed, memory, disk space, network bandwidth, etc.), response time, reusability, robustness, scalability (horizontal, vertical), security (cyber and physical), stability, supportability, testability, throughput, transparency, and usability (Human Factors) by target user community.

The term "context data" refers to any data pertaining to a software asset that is or contributes to a technical or operational property, feature, or condition of the software asset. Context data can be inferred or extracted from a context repository of the software asset. Context data can be technical or non-technical and includes but is not limited to source code, system architecture, file locations and filetypes, descriptions in natural language of the desired features and components of the software asset, and any data extracted therefrom that pertains to the software asset. Context data can be gleaned from any repository that stores data pertaining to the software asset including but not limited to systems of record, source code, software specifications, epic systems and databases, dependency management systems, project management software, business management software, source code management (SCM) systems, configuration management systems, application lifecycle management systems, test plans, dependency libraries, and any derivative of data contained in these systems, and can includes textual descriptions of the software asset or its functionality in natural or plain language.

Herein is described a system and method for automated task identification and extraction of task requirements for a software asset based on software project context. The presently described method and system also provides guidance for secure software development based on software context and directs developers' attention to task and security requirements of the software that should be addressed throughout the software development lifecycle.

The present method and system is applicable to software development throughout the software development lifecycle to identify task requirements using extracted context data from at least one context repository for the software asset and to prioritize task requirements during all phases of the software lifecycle. To automate tasks in a software asset, the system generates actionable guidance to orchestrate software development through a prioritized task list and guides the development of an individual application and software portfolio based on the context of each computing asset in the portfolio. Machine processes that can effectively address certain tasks are directed to implement the guidance, and a verification of risk control is carried out to confirm that the identified task requirements have been addressed. The system can further improve itself based on signals detected at every stage of the process using machine learning. By integrating the context databases of the software asset with automated software context extraction and a knowledge database, the present system and method can provide a prioritized list of task requirements list to guide the work of developers to optimize software development and maintenance and to mitigate risk in a system at all stages of the software lifecycle.

For the purposes of example, a business organization has a multitude of software assets in various states of ideation, development and deployment. Each of these software assets has its own set of features, uses its own set of libraries, has a unique file system with file locations, has a multitude of files each with their own language and code, and has its own set of risks depending on all of these factors. All of the features and conditions that contribute to the structure and operation of each software asset are herein referred to as the software context, and the software context contributes to and determines the risks posed by the software asset after deployment. During the ideation phase of a project to create a software asset, the context of the software asset may be limited to the features desired by a business unit, and the context may be written entirely in natural language. Software context at the pre-development phase is often stored as one or more stories or epics (long stories) on a business organization platform, where stories are usually short, simple descriptions of a feature or set of features told from the perspective of the person who desires the new capability, usually a user or customer of the system. Stories typically follow a simple template, such as "As a <type of user>, I want <some goal> so that <some reason>", where the reason is usually described by the user in natural language to define the terms of the desired feature, function, or outcome. The writer of stories is often a system user and not a developer, so requests for features are most often written in natural language. Business organizations develop future project lists from these stories and select projects for development based on their business priorities. Software context can be gleaned from these stories by natural language processing to extract information such as desired features, jurisdiction of software use, use case of the software, population of software use, and other context relating to the software operation and security environment. Project lists can be stored, for example, in internal systems of record or databases or project management software comprising core planning, executional, project accounting, and analysis systems pertaining to the business software assets. In the early development of a software project, context repositories are called upon to provide precedents and libraries, all of which contribute to the context of the software. Risks can further be introduced in the use of these context repositories, either by incorporation of a vulnerability at the time of development or by use or integration of a dynamic library or portion thereof, wherein a vulnerability is introduced later and awareness of the introduced vulnerability may only be brought to the attention of developers if the software asset workflow identifies and considers the risk of that vulnerable library throughout the software lifecycle. By using automated methods of extracting context information about the software asset and through regular updating of risk prioritization including vigilance for advising developers of potential vulnerabilities introduced by linked context repositories, developers can be provided with a prioritized plan for software development to identify and mitigate risks during the software lifecycle.

The software context can encapsulate both technical as well as business or process domains, and can comprise inclusion rules which relate to rules used in other parts of the system. Rules can be composed of Boolean operators and project properties, for example, the application uses Java AND the application is web-based. Based on the context of the software asset, tasks, risks and security requirements from a knowledge database are identified and a prioritized task list is generated and presented to developers to address during software development, during deployment, or after deployment. Dynamic consideration of the software context can be done throughout the software lifecycle to provide developers with security requirements as they arise, including guidance on how to address each requirement. Security and risk prevention as well as task orchestration can thus be integrated into the software asset from the early phases of the software life cycle through automated software context identification, and maintained throughout its lifetime. Many projects can be onboarded automatically using context repositories to extract context about a new project, with each onboarding including extracted context data from trusted context repositories, and many existing systems and context repositories can be leveraged to provide context breadth and dynamic task updating throughout the software asset lifecycle. Extraction of software context from natural language context repositories can also assist in providing additional information for business decision-makers regarding effort and cost for adding a feature or developing a new software asset based on the requirements and tasks required to achieve an acceptable level of functionality and/or risk, which can further assist with business decision making and prioritization of new software projects.

FIG. 1 illustrates a system 100 for generating a prioritised task list for a software asset by extracting software context from a context repository. The system uses the software context in each context repository 102 to select tasks or requirements from a knowledge database 108 based on the extracted software context. The system provides for automated task identification in a software asset based on the extracted software context throughout a software lifecycle such that task requirements can be identified and updated throughout the lifetime of the software asset.

One or more context repositories 102 are databases that contain context information about the software asset and comprise context data that pertains to the construction and/or operation of the software, where the context data comprises the characteristics of the software environment that pertains to the description, coding and running of the software asset. In an organization, business specialists often use natural language databases or systems to record and request features or software that will advance the organization and context repositories are any system where context specific to a new or existing software asset can be found in an organization.

The software context describes the characteristics of the software asset, including but not limited to the language, function, regulatory requirements, and connections of the software asset. In an example, an application or system may be described as having a set of attributes describing its behaviour and state, which is more broadly defined as its "context". Consider the set C containing the software context for a software asset, where C is composed of n possible ways to describe a system or application, and each element in the set is a technical, business, or other system-relevant context. In one example, the set of context data C can be defined as:

$$C=\{c_1, \ldots c_{i, \ldots} c_n; 1<i<n\},$$

where each $c_i$ context item contains context behaviour or state about the software asset or application,
and the values $c_i$ can be:
$c_1$: The operation and runtime of the application is subject to the laws of the United States
$c_2$: The application is developed using the Java programming language
$c_3$: The application makes use of a database
$c_4$: The application must be free of high priority vulnerabilities before it can be deployed to production Categories of software context can comprise, for example, technology used, data being handled, legal and other compliance sources, environmental attributes such as geographical and jurisdictional factors, functional requirements that affect security aspects, dependencies, programming language, platform, software asset technology area, data collected by the software asset, data shared by the software asset, business domain, regulatory requirements, security standards, network architecture, data processed or outputted, legal context (such as where or how the application is used), operating platform, and custom context described by an end-user. The software context can also comprise the nature of the project, security features, users of the application, access restriction settings, types of information being handled by the application, business drivers and policies, platforms, privacy requirements, technologies, programming languages, application interfaces, type of application, type of web server(s) used, integrated third party technologies and libraries, industry, environment, technology requirements and other integrated technologies. By extracting and analyzing context information about the software asset, a customized set of tasks and requirements can be automatically retrieved from the knowledge database based on relevance to the specific software project.

The context extraction engine 104 processes each context repository 102 to transform it into machine useable information and to extract context data for the software asset. The context extraction engine 104 may comprise code scanners, natural language processing tools, machine learning, and other tools. Meta analysis of the context data extracted by the context extraction engine 104 generates information about the software asset including the software asset system source or file structure. The meta analysis can provide specific information such as, for example:
File names: a list of all files used to describe and implement the state and behavior of an application or system
File types: a list of all distinct file types in use by the application or system as well as a count Changelog: The list of changes made to the source definition, including who or what made the change, the date/time the change was made, and a textual description related to the change Manifest/configuration files: details about an application or system's state or behavior that is encoded in one or more source files (For example, .ini, .xml, .sql, .json files) containing identifiers or details to initialize the application/system, or instructions for how an application should behave Dependencies: The list of self-contained components an application or system relies in order to properly function. Knowing dependency X is part of an application or system implies information about its behavior and state. e.g. if a library is known to interact with European General Data Protection Regulation (GDPR) data, if looking at dependencies, then application context includes GDPR requirement standards The software context can also include information relating to the software asset release or change, developers or developer teams that worked on the project, user inquiry responses, software asset names or identifiers, and/or identification of the business unit responsible for the application. Software context can also include technical aspects of the software asset such as, for example, management system integrations configured for the application, scanner integrations configured for the application, and risk policy details. In an example, consider a PHP application, which could have a meta analysis profile as shown in Table 1:

TABLE 1

| Attribute | Value |
| --- | --- |
| Files | index.php |
|  | composer.json |
|  | index.css |
|  | Init.sql |
|  | Update.sql |
|  | App.cfg |
| File types | .php (count = 1 ) |
|  | .json (count = 1) |
|  | .sql (count = 2) |
|  | .json (count = 1) |
|  | .cfg (count = 1) |
| Git commit messages | John Smith, Jun. 1, 2014, "created application" |
|  | John Smith, Jun. 3, 2014, "added logic to process credit cards |
|  | John Smith, Jun. 8, 2015 "Added support for database lookup" |
| Manifest/configuration | From App.cfg: |
|  | Username and password details to connect to a supporting database |
|  | Name of the application |
|  | Application username and password |
| Dependencies | Libxml |
|  | Openssl |
|  | Pcre |
|  | Postgres |

Various analysis tools and systems can be used to glean context data from context repositories. In one particular example, if an organization wants to build a software asset to achieve a specific result, the organization may generate tickets comprising features of what the software asset should do. Tickets written in natural language can become the input to task identification in the system, where a natural language processor extracts natural language context from the tickets.

The context extraction engine 104 stores the context data it extracts from the context repositories 102 in a context database 106. Automation of the identification and prioritization of software development and operational tasks during a software development lifecycle can be done by scanning context sources for software context using one or more scraping tools appropriate for scanning each context repository 102. Analysis of scraped or scanned context data can be done by natural language processing (NLP).

Machine learning and artificial intelligence can also be used to identify relationships between software features and technical context and provide a predicted subset of task requirements for the software asset, and be used to train the selection module 110 based on task elements already in the knowledge database 108, where subsets of related tasks can be extracted as a related group and added to the task list. For example, if context extraction reveals that credit card information is required AND a software asset operating jurisdiction is France, the set of requirements relevant to {function: credit card} and {jurisdiction: France} can be automatically extracted and added to the task list. In another instance of identification of application context, the context extraction engine can extract context data by querying a set of context data identities, for example:

```
{ .java files, database dependency, internal app ID }
A context processor would in turn extract the following context for the software asset:
Software asset project details = {
project survey answers: "Java web profile", "Uses a database"
custom attributes: internal app ID
}
```

Analysis tools and systems can also provide vulnerability and threat information about an application, as well product features. For instance if Fortify finds a "SQL Injection" vulnerability it is assumed that the software asset is using a database since the weakness "SQL Injection" can only occur if there is a database in use. The context tracked by these tools and systems can be described as a set of t context elements, wherein:

$$C=\{c_1,\ldots,c_i,\ldots,c_t\}$$

where $c_t$ is an analysis fact about a software asset.

For example, a code scanner such as Fortify™ tracks analysis facts $c_t$ about an application where $c_t$ is a weakness detected in the application, such as by SQL Injection, or by Insecure Transport: Insufficient HSTS Expiration Time. The set C can also include m context data collected from deployment phase tools such as Intrusion Detection Systems (IDS), wherein:

$$C=\{c_1,\ldots,c_d,\ldots c_m\}$$

where $c_d$ is an application threat detected, such as, for example "TCP over DNS response attempt" or "App privilege escalation attack attempt."

Software context information that can be gleaned automatically from electronic sources can be used to generate the task list. Where extracted context data is uncertain, the system can interrogate a developer to augment any information required to fill out the task list. The knowledge database 108 is a knowledge repository of task guidelines accessible with a retrieval tool, and integration with the knowledge database occurs throughout the software lifecycle, such as during creation of the project, during the requirements phase, design phase, development phase, test phase, deployment phase, maintenance and update phase, and replacement, and obsolescence or deprecation phase. The knowledge database 108 contains task requirement information for a wide variety of software applications, contexts, and implementations, and is updated regularly to accommodate real-time requirements and security challenges. The knowledge database 108 comprises a plurality of tasks, with each task having an identification of a coding requirement, security requirement, or regulatory requirement, and a recommended strategy for completion of the coding requirement, mechanism of addressing the regulatory requirement, or remediation of the security requirement and mitigating controls. The tasks in the knowledge database 108 can relate to, for example, general relevant security requirements, guidelines on secure architecture design, general development standards for different development platforms and technologies, sample tested code for implementing the standards, lists of security test cases and/or check lists to enable non-expert developers to systematically test security requirements, teaching modules, application life cycle management tracking, and bug tracking integration tools. Teaching modules and links to regulatory compliance requirements including Payment Card Industry Data Security Standard (PCI DSS), Health Insurance Portability and Accountability Act (HIPPA), Health Information Technology for Economic and Clinical Health Act (HITECH), Gramm-Leach-Bliley Act (GLBA), North American Electric Reliability Corporation Critical Infrastructure Protection (NERC CIP), and international privacy laws can also be provided in the task guidelines in the knowledge database 108 to assist developers by putting all requirements in a single location. Other tasks can relate to technology-specific advice that relates to particular standards, for example, particular advice on how to use the Microsoft Anti-XSS library to mitigate Cross Site Scripting for ASP.NET. Guidance can further be provided to different stakeholders in the software development lifecycle, and may be accessible by a standard, customized or filtered view. For example, requirements analysts can be shown or can sort for security requirements for the project, system architects can view advice or guidance on the design of the application, and testers can be shown how to test or validate completion of tasks. Tailored, relevant tasks including guidelines and code samples for a large variety of common programming languages, frameworks, platforms and other technologies can also be provided. Positive code examples and complete code examples may be imported or shown to address a particular task. Developers can download the code examples and try them or run them for themselves, for example in an integrated development environment (IDE) such as Eclipse™, where developers can view the complete code, and even run the full program to see the standard in action.

Each task in the knowledge database 108 has tags delineating its relevance to a particular software context so that the tasks required for a particular software asset can be generated based on the context data of the software asset in the context database 106. Accessing the knowledge database 108 can occur throughout the software development and maintenance process to provide an up-to-date prioritized task list 114 and guidance for each task which is relevant to the software asset. As the knowledge database is dynamically updated, the prioritized task list 114 for the software asset or group of software assets can also be dynamically updated such that risks are routinely assessed and incorporated to the guidance standards of the system. Without being bound by theory, one strength of the presently described knowledge database is that changes to regulations, security requirements, occurrence of malware, and security updates can be rapidly identified and updated in the software asset by updating the knowledge database and pushed to the prioritized task list for appropriate software asset management. In this fashion, updated requirements can be prioritized on the application-specific task list for a software asset. In one example, software context identifying a dependency that is found to be susceptible to malware can be immediately escalated on the prioritized task list and mitigated efficiently by developers. In this way developers can be rapidly alerted to updates relevant to each software asset based on previously defined software context and be provided with remediation guidance to mitigate risk in the software asset. The knowledge database 108 can also be accessed directly by a user interface with a database management utility. A web server can also permit an authorized user to link to a web application by means of the Internet and a user interface. A user interface can be used for coding the software asset by the developer, and can be a single computing device, a plurality of computers or electronic devices being used by a plurality of developers, or a distributed network or computers comprising one or more processor and memory operatively connected to the processor, and can further be connected to the Internet. The user interface may also have access to the knowledge database 108 and be able to access one or a plurality of different projects at the same time, as well as the prioritized task lists for one or more software assets in the organization.

Based on the software context, the selection module 110 is employed to select a plurality of task requirements for the software asset from the plurality of task requirements in the knowledge database 108, with the selected task requirements applicable to the context data stored in the context database 106 for the software asset under development or maintenance. The selection module 110 can also use computational methods that include machine learning or artificial intelligence to combine and/or match the information in the context database 106 with the tasks in the knowledge database 108 to generate a set of tasks pertinent to the software under consideration. Users can also have the capability of actioning the task list and provide a teaching set to the selection module 110 to enhance machine learning and task selection for future projects. For example, if task T is required whenever certain context is extracted into the database, some users will note that the task is not applicable. The selection module 110 can then use feedback data provided by the developer to assist in task selection for future projects with similar context data profiles. The system is preferably in operation through the software lifecycle such that updates to any of the context repositories, knowledge database, or software code or architecture are integrated and bring forward updated and timely task and requirement information from the knowledge database to the prioritized task list.

The prioritization engine 112 prioritizes the set of selected task requirements identified by the selection module 110, where the prioritizing is based on the task orchestration or risk of each of the selected task requirements to generate the prioritized task list 114. The prioritized task list 114 can be stored on a computer, server, or on another electronic device or system, and can be accessed by and presented to a developer on a user interface. The prioritized task list 114 can also provide guidance on task orchestration based on a known or learned most efficient (in time or money) timeline or order to handle the set of tasks. The orchestration can result in a cascading effect of task management such that addressing of certain tasks has a greater downstream effect if identified early in the task identification process. By regularly reviewing the prioritized task list 114, developer and management teams can also be provided with real-time visibility of a project's verification and completion status during production. Timeline for deployment can be assessed based on the accumulated remaining tasks and goals of the organization. By integrating a security knowledge database with security information and event management (SIEM) tools, the present system can also be configured to update the verification status of project tasks and security status of software assets, both during software development, after launch, and throughout the software application lifecycle. The system can also intake or consume feedback during runtime or operation so that it can influence which tasks are most relevant to the application and reprioritize them. Appropriate teams and/or developers can also quickly respond to any feedback or changes to the prioritized task list to change focus and mitigate risk or orchestrate work according to best practices. Task prioritization can also be rapidly adjusted based on the public electronic security environment of the software asset to direct developer attention to issues that require more immediate attention at any point during the SDLC. Once the application has been launched, updates to the knowledge database can trigger software asset update action tasks based on the identified software context of the application to maintain operation and security standards and mitigate risk of the software asset during its lifetime.

Each task in the prioritized task list 114 can further include tailored relevant test cases and sample quality assurance test code, including tracking and audit trail information for satisfying requirement standards and audit criteria, best practice rules concerning the design of software code to produce software assets, as well as rules concerning security structures and procedures for communication on the internet and for particular businesses. For example, if the software context indicates that the software asset is used within a financial institution having credit card transactions, the task list would include regulations and control frameworks such as the PCI DSS, COBIT, ISO 27001 (formerly 17799), GLPA, and the like. In another example, if the project software context indicates that the project is related to the healthcare industry, privacy regulations for medical data can be put in the task list. The knowledge database 108 may further include best practice rules concerning the design of software code to produce software assets as well as rules concerning security structures and procedures for communication on the internet and for particular businesses.

The combination of dynamic and ongoing extraction of context data for the software asset and a regularly updated knowledge database 108 throughout the software lifecycle provides timely updates to the prioritized task list 114 based on context information of the software asset, and thus cradle to grave task and risk identification and remediation throughout the software development life cycle. Without being bound by theory, one strength of the presently described system and method is that changes to dynamic context libraries, newly identified risks in static libraries, new security regulations, occurrences of malware, and security task updates can be rapidly brought to the attention of developers at any stage of the software lifecycle by updating the requirements in the knowledge database 108. These updates can then be pushed to the prioritized task list 114 for appropriate software asset management, optionally with a security risk assessment. In this fashion, updated tasks can be prioritized on an application-specific prioritized task list 114 for the software asset. Developers can therefore be rapidly alerted to security updates relevant to each software asset based on previously defined software context and be provided with remediation to avoid security risk in the software asset. In an environment where multiple software assets are being developed and/or maintained by a single team, the team can also be quickly made aware of security updates as they are added to the knowledge database, with priority alerts for high priority requirements to respond quickly in high risk situations.

Figure 2:
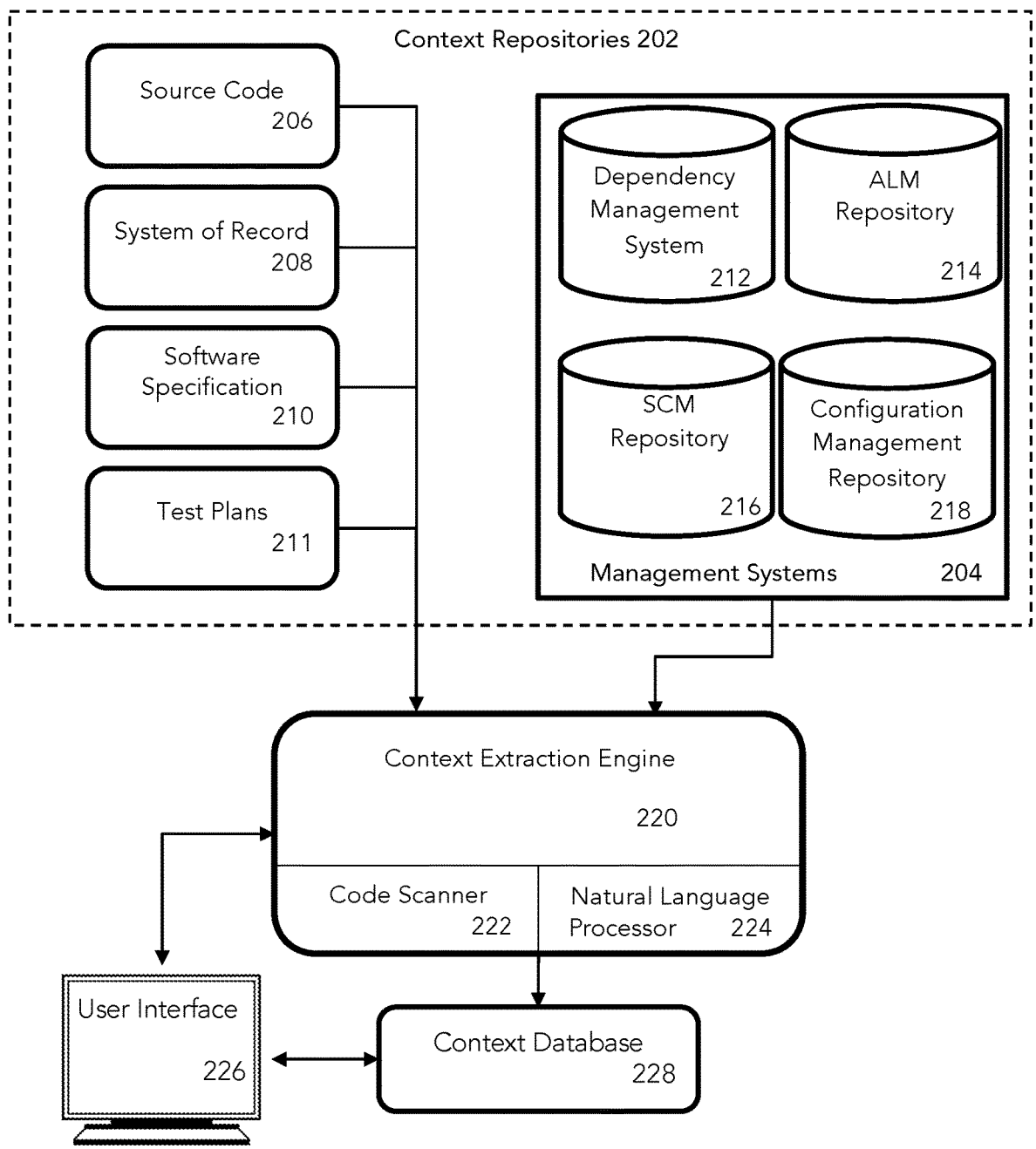
FIG. 2 illustrates a system for context storage and extraction.

FIG. 2 illustrates context storage and extraction in the present system. Context repositories 202 are databases or storage systems that contain context information about the software asset project and comprise context data that pertains to the construction and/or operation of the software. The context data for a software project can be stored in source code stored in one or more sources of source code 206. The source code 206 includes code that is part of the software project. Epic or stories relating to the software asset can be stored at least in part as natural language in one or more software specification 210. The software specification 210 contains functional requirements, design specifications, diagrams, epics, user stories, software development contracts, and any other documentation used to specify the software and/or its internal workings. The software specification 210 may contain descriptions in natural language of context feature or set of features, user populations, jurisdiction, or other context details relevant to the software. The software specification 210 can also contain natural language descriptions of work, such as ticketing systems, or new work that will come or is requested or recommended in the future, such as found bugs or requests for updates or upgrades.

A system of record 208 is an information repository that collects and tracks facts about applications and systems, often structured as a form-based description of one or more software asset. The system of record 208 can include information about types, business units, fact-based description of an asset, and where the software will be deployed. The system of record 208 can be based on commercial off the shelf (COTS) software or can be custom built. One type of system of record 208 information store is the Project Portfolio Management (PPM) system. One COTS PPM example is "Clarity PPM". The PPM stores a list of applications, teams, budget details about the applications, high-level descriptions about work planned or completed for the applications and other details. The system of record 208 can also be thought of as a collection of facts about a software asset, wherein the facts can include the specification of the physical server where the software assets is stored, which licenses are required to use a particular $3^{rd}$ party tool, and other data concerning the internally created application. The system of record can also contain preliminary information about the application, such as title, timeline, team, provisional features, corporate policy, and organizational standards. The present system can comprise one or more system of record 208. Context data for the software asset can also be stored in test plans 211, which are a set of instructions for validating functional or non-functional behaviours of the software. Test plans 211 can be in the form of natural language, computer-readable format, and can include but is not limited to unit tests, full stack tests, regression tests, smoke tests, performance tests.

Management systems 204 are a set of data repositories, each of which provide a system for managing details of the software asset in a structured way. Due to the nature of how data about the software asset is described and stored in the management systems 204, management systems can be mined to extract relevant context about the software asset. Management systems 204 can include, for example, one or more dependency management system 212, one or more application lifecycle management (ALM) repository 214, one or more source code management (SCM) repository 216, and/or one or more configuration management repository 218.

A dependency management system 212 provides external code used by a project and stores or points to or otherwise provides access to libraries used in the software asset. Libraries used in the software asset can be private, purchased, public, proprietary, or a combination thereof. Identity of a dependency management system 212 can be extracted from the source code 206 to identify what libraries are used, look up what libraries are tied to that library, and identify any vulnerabilities or potential issues associated with any linked libraries. The meta analysis of an application source identifies a set of dependencies in use by an software application, asset, or system, as well as dependencies of those dependencies. For each dependency, the dependency management system 212 is examined to determine or identify any implied dependencies. For example, if an explicit dependency A (a dependency identified by the meta analysis) relies on dependency B and C, then if an application/system uses dependency A, the context about the application/system will also include the implied dependencies B and C. Dependencies B and C may also imply other dependencies, which are also contemplated in the present system. Some examples of a dependency management system are PyPI, Maven™, and Sonatype Nexus™. After all explicit and implied dependencies for the software asset have been collected, for each defined dependency the software context is collected from a dependency management system, where the software context is a set of context dependency data $C_{dep}$ where:

$$C_{dep}=\{c_1, \ldots, c_i, \ldots, c_w\}$$

and $c_i$ contains details such as the name of the dependency, the technical requirements for using the dependency in an application, and the classification, where one or more classifications bring further technical, business, or custom context to the dependency, and one example $c_i$ is:

Name: Database Driver
Technical requirements: Needs credentials, Network (type=TCP, port 3306)
Classification: Database By monitoring the software asset dependencies, updates to linked dynamic libraries that pose a security risk or newly identified vulnerabilities introduced by static linked libraries can be identified by the system, assigned a risk ranking, and served to the task list at a priority level based on the level of risk posed by the issue. Deep reach of the present system into linked and dependency databases and libraries enables any remote update to be considered as a security risk and brought forward as required to address any risk introduced at any stage during the software lifecycle.

An applications lifecycle management (ALM) repository 214 manages requirements, tests, plans, tasks, bugs and issues during software development. ALM repositories can both introduce risks through code they provide, as well as help with risk mitigation by providing information about risks. ALM tools can also store details about work planned or completed for an application or system. The work done by an ALM is often organized into units called "issues", where an issue may be of type "epic", "story", or "task". Work requirements are often stored as natural language sentences and other technical details, such as source code excerpts, as well as links to other systems relevant to the work. For example, a story may be written by an application product manager: "As a user I need to be able to update my first and last name". When work on this story is initiated, a development team would translate this natural language definition of a new feature to a new capability in the application or system. The natural language definition of work can manifest in updates to application/system files and ultimately as a state or behavior change when the updated application is deployed. Each change can then be tracked in the application or system changelog. The work defined in an ALM issue can also provide details on the business and technical requirements of the software project, including any specific data flows, user experience, and other relevant details needed to implement a change. The context captured from an ALM issue can also include a classification of the issue as well as any other information from the work: such as files changed in order to implement the work. Some specific examples of ALM repositories include bug tracking/ticketing systems such as JIRA™ and CA Agile Central.

A source code management (SCM) repository 216 tracks application and system source code, and is where code is maintained and changes are tracked. The SCM repository 216 can include a detailed changelog including the time, change description, annotations, and affected application asset name for the source code, as well as software asset identifiers such as a list of team members, versions, and build configuration. One or more source code management repository 216, when externally located, may introduce new vulnerabilities, or may eliminate existing ones, when code the software project requires is updated by external parties. Some specific examples of an SCM repository 216 includes github.com, bitbucket.org, an internal subversion database, and other git repositories. In one specific example of an SCM repository 216, context data pertaining to the software asset can be defined as the set $C_{code}$, where:

$$C_{code}=\{c_1, \ldots, c_j, \ldots, c_n\},$$

and the $j^{th}$ context element could include details such as:
Date—the date and time when the change is made
User—the user who made the change
Description—details about the change
Files—the assets affected by the change
Code—recording of the actual code changes A configuration management repository 218 can store information about how a system is configured and where and/or how a software asset should be deployed. Configuration management systems also store information to support the deployment of an application as well as to ensure consistent performance and function during its deployment, such as, for example, what libraries should be installed in the system, how the web server is configured, how the system is configured with respect to, for example, firewall rules, user access rules, and network access details. Some non-limiting examples of configuration management systems include Puppet™, Ansible™, Chef™, and SaltStack™. The context data in at least one configuration management repository 218 can be described as $C_{conf}$ comprising a set of t context elements, where:

$$C_{conf}=\{c_1, \ldots, c_i, \ldots, c_t\}$$

and $c_i$ is a configuration management fact about an application or system, where $c_i$ can include details such as a list of services such as Nginx™, Apache™, MySQL™, firewall details, operating systems, libraries, and configuration for services and applications.

A context extraction engine 220 extracts software context from the context repositories 202 using a plurality of tools, such as, for example, a code scanner 222 and a natural language processor 224. Using a code scanner 222, software context can be extracted from the source code 206, including a plurality of details about the software asset that may include and are not limited to the programming language, the system architecture, the locations of files, the types of files, libraries used, and other details. The code scanner 222 can be, for example, a dynamic application security testing scanner (DAST), a static application security testing scanner (SAST), Application Vulnerability Correlation tool, aggregating scanners, Interactive Application Security Testing (IAST) scanners, Runtime Application Security Protection (RASP) scanners, or combination thereof. The code scanner 222 can also be used to analyze the scanned code to provide further context information to assist the selection module in selecting security requirements for the software asset. A natural language processor (NLP) 224 is used to extract context data stored as natural language from any context repositories 202 that contain natural language, such as the ALM repository 214, system of record 208, or software specification 210. Extracted context data is stored in a context database 228, which contains extracted context about the software asset.

A code scanner is used to scan code, extract software context from the source code 206 and SCM repository 216, capture code vulnerabilities, or detect code deficiencies which can confer risk in a software asset or software operating environment. A variety of code scanners 222 can also be integrated into the present system both to extract context from the source code and to identify vulnerabilities in the source code. The code scanner can include but not limited to Static Application Security Testing (SAST) scanners, Dynamic analysis or Dynamic Application Security Testing (DAST) security scanners, aggregating scanners, Interactive Application Security Testing (IAST) scanners, and Runtime Application Security Protection (RASP) scanners. Runtime security testing tools can also be incorporated to generate rules for runtime testing and the security task list dynamically updated. Scanners use heuristics and automated means to explore the behaviors of a software asset to detect weaknesses. Advanced and dynamic synchronization with code scanners can provide additional capabilities, including automatically updating the requirements task list based on vulnerability information from the scanning tool when the code scanner is updated, and updating the project settings automatically based on the vulnerability or metadata or context details discerned from the code scanning tool. The whole set of extracted context data is also referred to as the context profile for the software asset, and is stored in context database 228.

A user interface 226 can also be used to obtain additional information for the context database 228 and context extraction engine 220 through direct user input. Communication between the user interface 226 and the context extraction engine 220 can be bidirectional to enable cycles of refinement by the context extraction engine based on user input.

Figure 3:
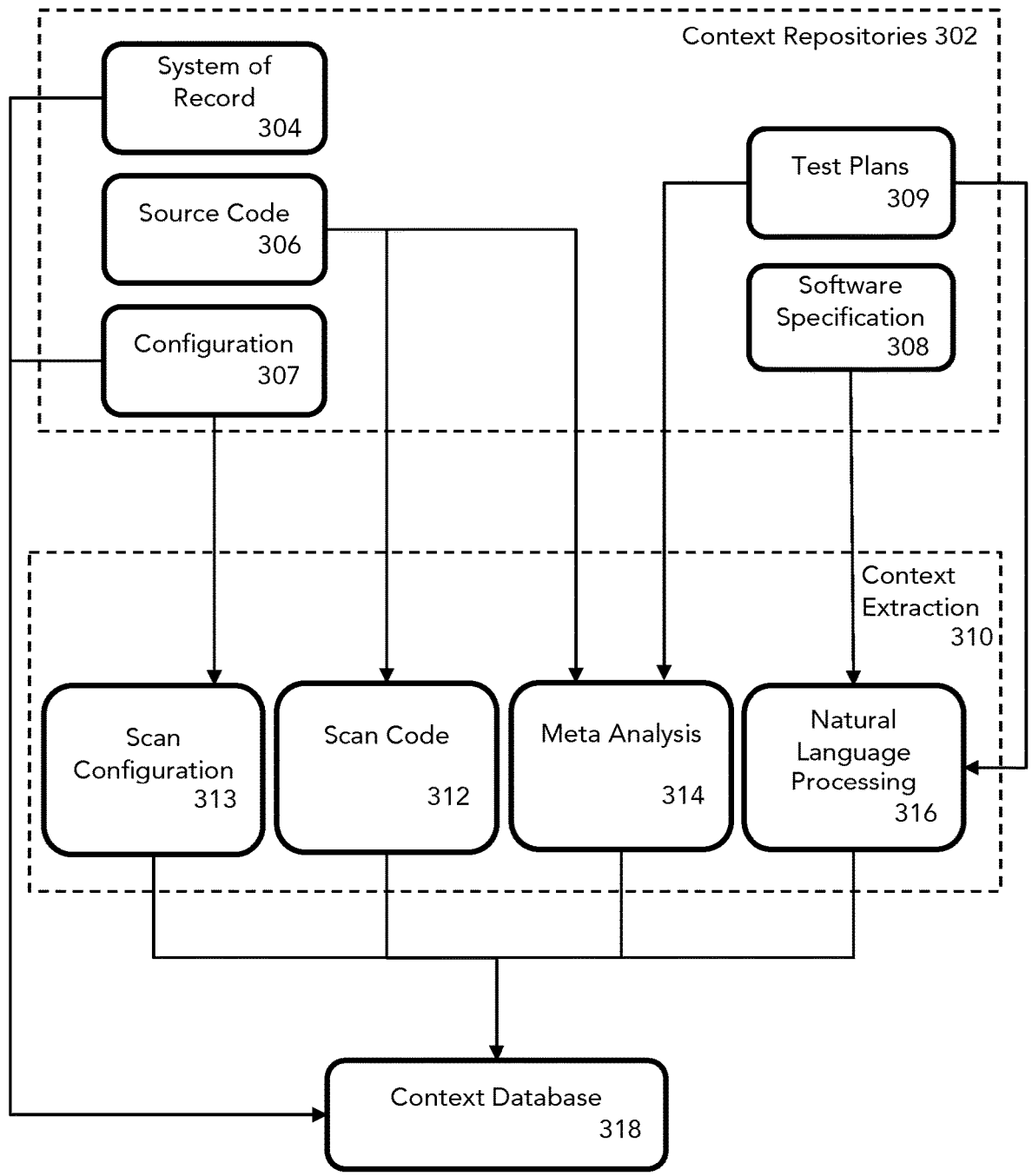
FIG. 3 illustrates a method of data flow from context repositories in the present system.

FIG. 3 illustrates a method of data flow from context repositories 302 in the present system to a context database 318. Context repositories 302 contain data related to the new or existing software asset that is mined to extract software context for creating a context profile for the software asset. Context extraction 310 can be performed by a variety of processes to extract context data depending on how the data is stored in each of the context repositories 302. Data from a system of record 304 can be processed, or directed to the context database 318 with minimal to no processing. Source code 306 can be processed by scanning the code 312 using one or more code scanners. Source code 306 can also be processed and context extracted by performing a meta analysis 314 on the data to extract meaning from words and code and/or by scanning the code 312 of the software asset if development has begun and source code exists for scanning. The configuration 307 of a software asset includes its operation specification that describes its running and execution environment. Context data in a configuration 307 can be processed by scanning the configuration 313 and/or sent directly to the context database 318. A configuration scan 313 reveals the software asset configurations, which can be specified by a manufacturer, and optionally locally tailored to adapt to local policies. Context data from a software specification 308 can contain stories or epics in the form of natural language, and the natural language is processed by natural language processing 316, optionally using an artificial intelligence system. Context data in test plans 309 stored as natural language can be processed by natural language processing 316, and context data in test plans 309 stored as computer-readable format can be extracted performing a meta analysis 314. All extracted context data is then stored in one or more context database 318.

Figure 4:
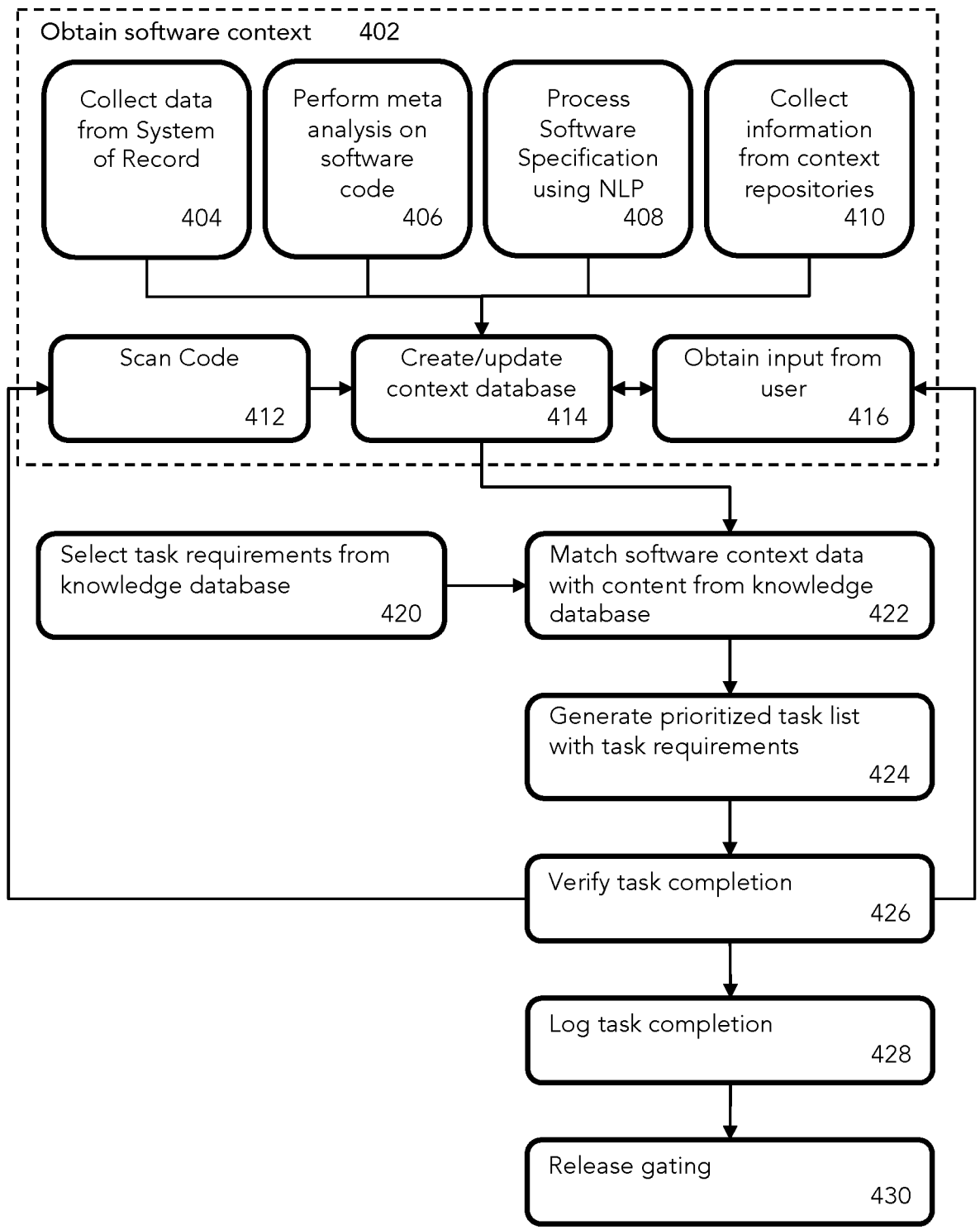
FIG. 4 illustrates a method of automated task identification and verification in a software lifecycle.

FIG. 4 illustrates a method of automated task identification and verification in a software lifecycle. Steps of the method shown in FIG. 4 can be done at any point during the software lifecycle, and preferably throughout the software lifecycle. Software context is obtained 402 by scanning, scraping, or extracting context data from multiple sources related to the software asset. Context data is collected from a system of record 404. A meta analysis is performed on software code 406 to extract code context as well as embedded natural language. In addition, software specification data sources are processed using natural language processing (NLP) 408, optionally with artificial intelligence, and context information is collected from one or more context repositories 410. The context database is then created or updated 414 for the software project comprising all of the context data collected from the multiple sources of context data. Task requirements are selected from a knowledge database 420 based on the software context identified, where the selection is from a set of software elements, tasks or requirements in the knowledge database. In particular, the system matches software context data with content from knowledge database 422 to select tasks relevant to the software asset. Relevant tasks are selected based on the context of the software asset, for example if the jurisdiction of the software is limited to Europe, then only tasks relevant to European-based requirements and standards will be selected, and not those specific to other jurisdictions. Once the requirements have been identified for a software project, a prioritized task list is generated 424 with task requirements to provide a prioritized task list comprising development guidelines and security requirements relevant to the software project based on the extracted context profile for the software asset. Prioritization of the task requirements can be based in part on a quantitative measurement algorithm, such as the Common Vulnerability Scoring System (CVSS) Database, for denoting risk for a particular weakness, confidentiality, or integrity, or vulnerabilities identified by a vulnerability code scanner, or other method. When a task from the task list has been addressed, a verification procedure is used to verify task completion 426 by testing the application software to ensure that the task has been adequately addressed, which can also be provided in the security requirement guidelines. The guidelines for each task requirement in the task list preferably contain an identification of the task to be addressed, the solution, and a verification procedure, all in a single location for ease of implementation, understanding and integration by the developer.

Verification of task completion 426 can be done manually, and/or be sent to a code scanner to scan the software code 412. Scanning the code 412 can also identify code vulnerabilities during coding or verification in software development, as well as extract additional context information from the code of the software asset. By identifying which vulnerabilities, context information, and security identification code scanners are effective at extracting and identifying and which they are not, human developers can be directed to focus more expensive human testing resources on issues not well caught by automated code scanners. A Quality Assurance (QA) testing tool can also be provided that includes testing standards as test cases into QA testing systems so that QA staff can keep track automatically run scripts and keep track of test coverage and pass rate. In one example, WebInspect™ can provide standards on how to test for a particular weakness, or alternatively notify a user if the weakness test is done automatically. A variety of verification tools, as well as manual verification, may also be used to confirm that a particular task or requirement has been adequately addressed. Multiple code scanners can also be used to combine verification information from different code scanner tools into a single verification result. If multiple scanners are being used to scan the software code, results from the multiple tools can be aggregated to provide a single verification result and optionally an associated confidence value, provided that each of the multiple tools has been confirmed as effective at performing verification for which the code scanner is indicating a passing verification result. The verification result can appear as a flag inside a task view of the prioritized task list, within the task requirement, or at various locations on the system graphical user interface. The system can also identify tasks from the prioritized task list that require additional verification and reprioritize tasks accordingly. For each task, the system can also track whether the task requires manual testing, and which scanning tools can be relied upon to verify compliance. Verification can be assigned manually or automatically via scanner feedback. Code scanner integration can further identify code associated with a task and provide pass/not pass based on that scanner, as well as dynamically re-checking the code throughout the SDLC to bring forward any security tasks that have failed later verification. Other context data can be collected, such as which developer resolved a particular task, and how long it took them to complete it, and the time and date of verification, further providing tracking and accountability for performing software security activities. Identification that individual standards were followed provides traceability and allows SDLC stakeholders to communicate their completion standard for each phase.

The requirements task list can be updated with the status of the tasks to verify task completion 426 based on the verification status of each of the listed tasks on the prioritized task list. In one example, a task can be marked with a verification status of "To Do" or "Done" based on the verification results or the way in which the task was addressed, for example "machine" or "human". If a task has been sufficiently verified, then the task can be marked "Done". In cases where further verification is needed, the task can remain marked "To Do" such that further effort can be applied to verify that the task has been properly addressed. In another example, a verification status can be multi-fold, and be given one of a plurality of status levels, such as "Verification Pass", "Verification Fail", "Verification Partial Pass", or "Pass", with further details on how the verification status level was assigned, such as whether it was verified by a machine or human. A task with a "Verification Pass" can be further assessed as low risk and adequately addressed. A task marked as a "Verification Fail" can indicate a vulnerability was identified, a task has not been completed correctly or must be addressed, and that the task should be worked on or scrutinized again. The task is thus assigned an incomplete status. A task marked with a "Verification Partial Pass" can indicate that its controls and mitigation instructions need additional effort to confirm it as verified. A task can also be marked with a "Verification No Status" where no verification status is available. In this case, either it is known that the machine used to address the task is incapable or unreliable at task completion, or the ability of the tasked machine at identifying whether a particular task has been properly addressed is unknown. A "Verification No Status" verification can also indicate that the controls and instructions associated with the task need additional work to confirm as verified. Details of the verification results can be provided to the developer to direct further efforts. Upon verification of task completion 426, the system can log task completion 428 including additional context regarding who/what completed the task, what was done for task verification, and when the task was completed, which contributes additional context to the context database. Task completion can also be logged 428 to provide tangible audit evidence and trace compliance with security, compliance, or regulatory standards. Once a requirement or task has been completed it can be so designated by manually clicking a button or entering data, giving project teams auditability as to which user and at what time has completed which actions. Project managers can track task completion logging to confirm that developers have followed programming guidelines and secure development standards. The task list can also enables multiple users to update the system and complete tasks concurrently and provides the ability to freeze changing of the project properties. Enterprise-wide compliance for application security relevant legislation and/or regulation can be updated based on task completion, and can show compliance status to, for example, PCI DSS, NERC CIP, GLBA, and HIPAA for the project. Specific auditing and regulatory guidelines can be generated and traced for later use to generate required reporting, and additional data may be collected on when guidelines are employed, implemented, and tested, and reports of compliance can also be generated for audit purposes as well as regulatory purposes, such as demonstrating compliance to requirements, implementation, and testing guidelines. A release gating 430 can also be used to quality validation or verification of task completion.

In creation or updating of the context database 414 further clarification can be used by obtaining user input 416 to provide additional context for updating the context database, which could include updating or adding relevant context, clarifying context, or removing irrelevant context. In particular, addition to the automatically extracted software context, additional input can be obtained from users 416, wherein the system can request a developer to provide additional information regarding the software context in order to best select the appropriate task requirements from the knowledge database and to augment context profile for software asset in context database. The inquiry for input from users 416 can be provided as a list of curated software context inquiries from which the developer can identify details on the context of the software asset for which the system is unable to extract or requires verification. Machine learning can also compare context profiles of a test set of software assets to learn which task requirements are relevant to particular context identified to more accurately select tasks. The system can also direct questions to developers to gain a more complete profile of the context of the software where data is lacking, providing additional teaching to an artificial intelligence on context-relationships for particular tasks. Questions can include inclusion rules so that the system only asks relevant questions, for example, only asking what version of Java is being used after the software project is identified as using Java. The identified software context thereby enables the selection module to refine a cascading set of more detailed questions as well as retrieve relevant security guidelines and requirements for developing a secure software application. In one example, identifying the language "Java EE profiles" from a list which includes Java, Tomcat, and Apache, brings forward a set of pre-populated attributes pertinent to Java EE profiles for the project. Project context attributes can further be itemized and accessible to stakeholders, for example, identification that Apache Struts was being used in the software asset, and guidance specific to Struts that supports Struts can be provided from the knowledge database via the selection module. Developers can also provide additional details about the context and functions of the project, for example, by specifying whether the application being developed involves interactions with an operating system, file-upload function, authentication of end users, etc. In another example, one software feature can be "application uses Java" and another might be "application must comply to Payment Card Industry Data Security Standards", and a security requirement will be selected based on the intersection of the combination of context information.

Figure 5:
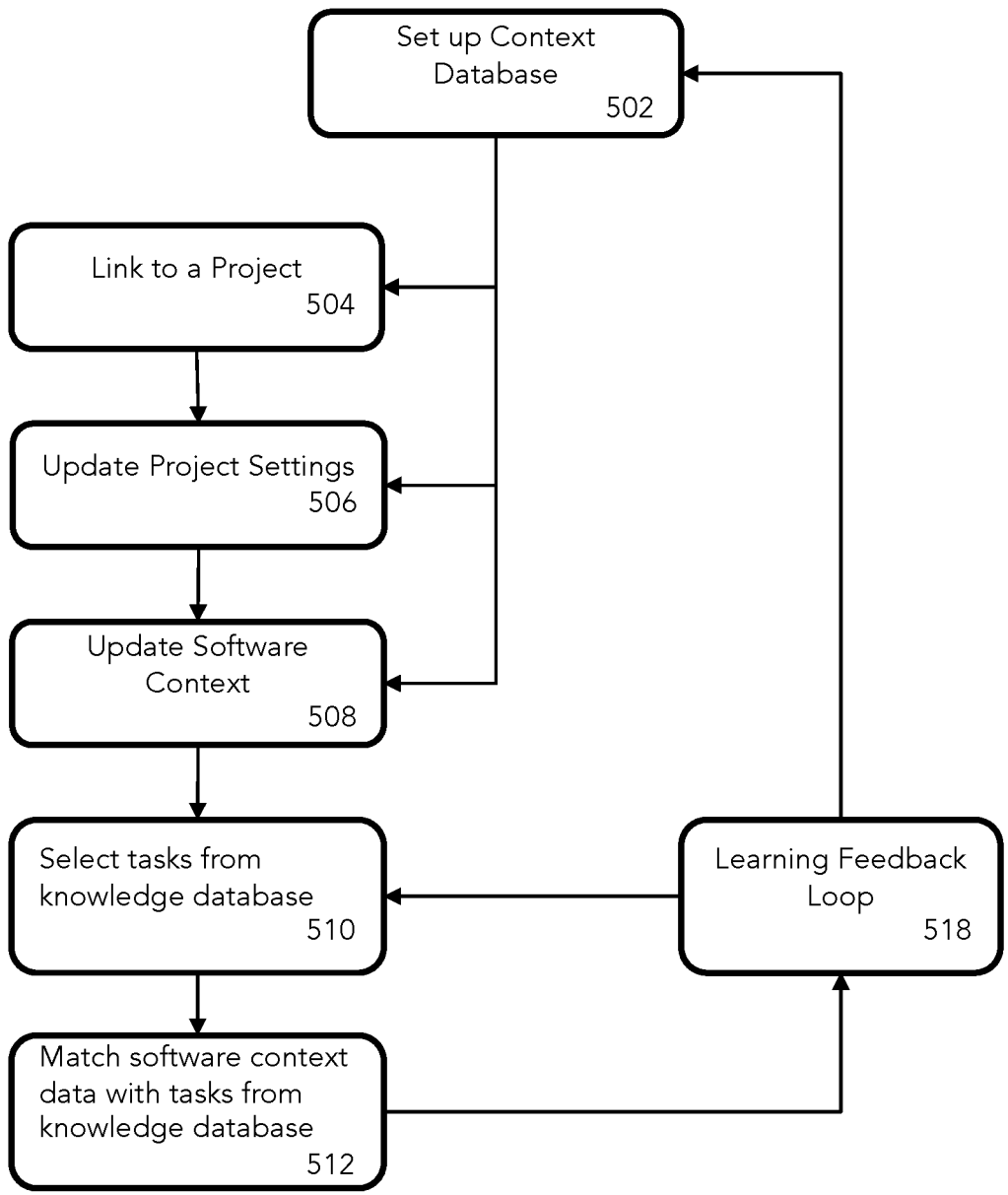
FIG. 5 illustrates a method of extracting context data for a project and selecting requirements based on the extracted context.

FIG. 5 illustrates a method of extracting context data for a project and selecting requirements based on the extracted context. A context database 502 is set up for a new or existing project software asset and the present method generates a set of work tasks by incorporating the project settings and software context of the software asset. From the context database 502 is created a link to the project 504, which includes a location where project settings can be updated 506, and a location where the software context can be updated 508. The project settings can include details of how a project is categorized amongst other projects in the system, and the project can be contributed to by both human and machine work participants, which provides additional attributes which describe the project. In one example, a context database contains extracted context about the software asset, where the set of context data for the software asset is defined as:

$$C_{context} = \{c_1, \ldots, c_j, c_{j+1}, \ldots, c_{j+k}, c_{j+k+1}, \ldots, c_{j+k+m}, \ldots, c_n\}, \text{ where } 1 <= j <= k <= m <= n$$

Tasks are selected from the knowledge database 510 based on the software context. The system uses the context data from the context database to create a list of task requirements for the project. Consider the set of context data for the software asset $C_{context}$ above, wherein:

$C_1 = \{c_j, c_{j+1}, c_{j+2}, c_{j+3}, c_{j+4}\}$ denotes a subset of $C_{context}$, where $C_1$ is composed of a list of context elements or discrete context data used to derive the project settings, and $C_1 =$
{ Application is assigned to Business unit "Corporate",
Application project manager contact is jsmith@example.com,
Application is identified by internal ID "CORP_ID_ABC_123",
"Team XYZ" has access to Application source code in the Source code repository,
Tool "Fortify" is configured to scan Application for software weaknesses }

The system processes $C_1$ and performs the following operations corresponding to the elements above.
1. Project P is created and assigned to the "Corporate" business unit in the System
2. Project P is assigned to the user given by "jsmith@example.com"
3. An identifier "CORP_ID_ABC_123" is assigned to the Project P
4. The group identified by "Team XYZ" is assigned to Project P
5. A Fortify scanner integration is configured for P The Software Context is then computed from context data in the context database. Consider a second subset $C_2$ of context data where:

$$C_2 = \{c_{j+k+1}, \ldots, c_{j+k+m}\} \text{ from } C_{context}, \text{ having } m \text{ context elements.}$$

The system then computes a software context for Project P, where the software context comprises the characteristics of the software environment pertaining to the coding and running of the software asset. Matching of software context data with requirements from a knowledge database 512 is then done by matching the context profile and individual context data in the context database for the software asset with corresponding tagged requirements in the knowledge database. A learning feedback loop 518 can further monitor patterns of context extraction, augmentation, and addition by developers to create a model of context profiles using machine learning and/or artificial intelligence. New tasks may be found during the verification or logging of task completion that were not initially captured during context extraction. The learning feedback loop can then update the task selection process so that these tasks are captured in future projects. For example, if the prioritized task list excludes a task that a developer adds to the project, system can automatically add the task to the context profile of a next project having a similar context profile. In the same way, if a particular requirement is brought into the task list for a project and a developer considers that the task is not relevant to a particular project, the developer can remove the task and the system can learn not to include that task in future projects with similar context profiles. In this way the machine learning model can be updated when a task is added or removed from the task list, or when matching rules which match extracted context with tasks in the knowledge database are updated. In one example, a human or machine process can further identify that a work task T1 of type T identified by the system is not relevant to Project P. The system incorporates this feedback and updates the internal matching rules for work task T1 so that in the future, T1 is not included in a project having similar software context. Alternatively, a human or machine process can include a work task T2 to a Project P. The system can then update the internal matching rules so that T2 is included in projects having similar software context profiles.

Figure 6:
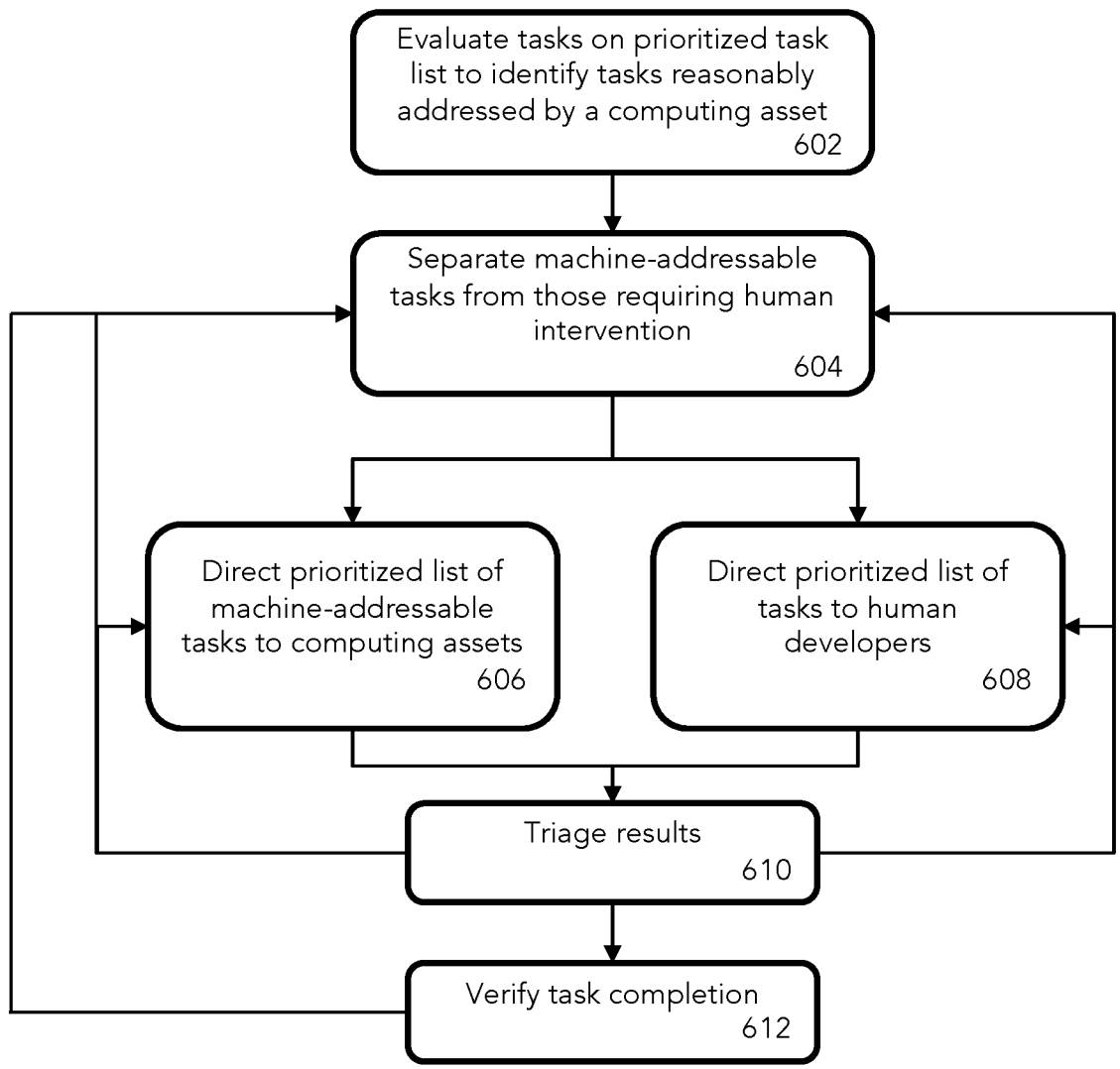
FIG. 6 illustrates a method of orchestrating workflow to human or automated systems.

FIG. 6 illustrates a method of orchestrating workflow to human or automated systems. Task requirements to be addressed are presented on the prioritized task list in priority order depending on the nature of the task. Human or machine processes can be engaged to implement tasks selected from the knowledge database by automatically directing machine addressable requirements to computing assets capable of addressing the requirement, thereby reducing the need for human intervention. Once tasks are identified and the prioritized task list has been created for a project, the system evaluates each task on the prioritized task list for whether the task can be reasonably addressed by a machine asset 602, and separates machine addressable tasks from those requiring human intervention 604. Particular tasks in the knowledge database may be categorized as requiring manual or human verification based on knowledge that the requirements associated with these elements are not adequately detectable, mitigated, and/or testable by automated methods, and directs these tasks that are not easily or reliably addressed by an automatic or machine process, or require human verification, to the prioritized task list of a human developer 608. Selection of tasks in the prioritized task list that require manual intervention can be done using a task filter to identify which tasks are best suited for and/or require human intervention for further analysis and verification, and which tasks can be adequately addressed by a machine. Tasks reasonably or reliably addressed by an automatic or machine computing asset are sent to the prioritized task list of a computing asset 606 to be addressed. Results from the machine or developer prioritized list can then triaged 610 and assessed by a human or machine to analyze the output from the list of machine-addressable tasks as generated in the step of separating of machine-addressable tasks from those requiring human intervention 604. False positive results are identified in the list triage 610 and removed and re-evaluated based on experience (developer) or knowledge of the context (machine). A feedback loop may direct any given task back to the prioritized list of machine-addressable tasks to computing assets 606 and a machine may be re-assigned to verify the same task but with new instructions. Alternatively, any triaged task may be moved from the list of machine-addressable tasks to the list of tasks requiring human intervention to human developers, as triaged and determined by a machine or developer. In the prioritized task list of a human developer 608, a human may identify a task as being best verified by machine, and the system and/or knowledge database containing details about the task can be updated with a new tag to ensure that future similar tasks are directed to a machine for processing 606, and vice versa. If an error occurs during the process or if details indicate that the machine is not capable of validating the task then the system is updated with information about the machine asset capability or lack thereof to address the task and the task is redirected to the prioritized task list of a human developer 608 for re-processing. Verification of task completion 612 for each task on the combined prioritized task list for the project can be handled in a similar manner, by evaluating whether the verification of each task can be reasonably addressed by a computing asset or requires human verification. Each task in the knowledge database can include details on what tasks require human verification, and can be coupled with the prioritization engine to provide a prioritized task list and assigned a verification confidence score for developers to address, which optimizes use of valuable developer time and guides developer attention to the remediation of higher risk security tasks not well identified by automated tools. Once the task is complete and verified the task is removed from the prioritized task list for the project. By prioritization and orchestration of tasks amongst automated systems and human developers, software development and security tasks can be streamed into a set of automated and a set of manual tasks so that tasks are addressed expediently in order of priority and risk is controlled.

Figure 7:
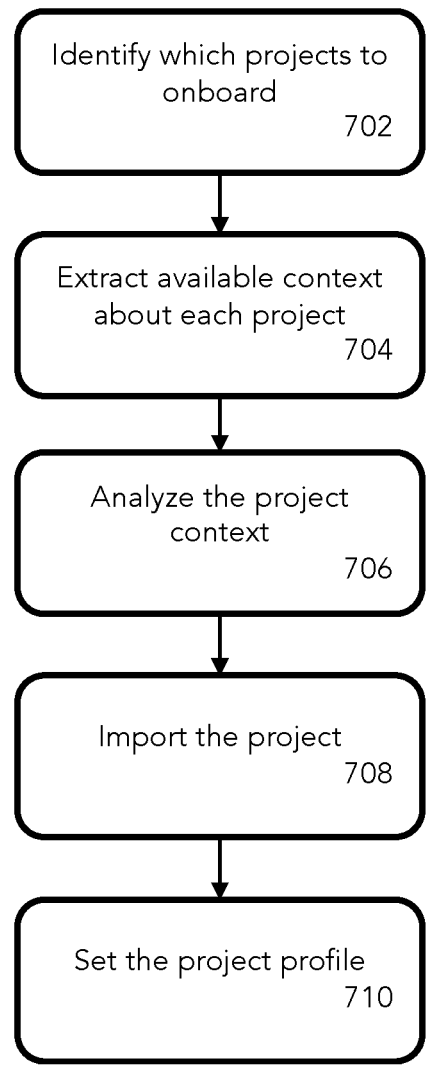
FIG. 7 illustrates a workflow for onboarding one or more projects.

FIG. 7 illustrates a workflow for onboarding one or more projects. In particular, the presently described system is capable of automatically discovering software assets in an organization and onboarding one or more software assets into the system to track the software asset throughout its lifecycle. In the onboarding of one or more new or existing projects, project or projects to onboard are selected and identified 702. Project onboarding 702 can be based on number or content of tickets, for example, in an epic database, or by business priority of the organization, ease of resolution, software specification, or by risk evaluation. The available context is then extracted about each project 704 by one or more extraction engines. File context about a project can be identified using, for example, the script <scan.py--dir/project/path/--operation=analyze> Some features that can be extracted about a project from its source directory, for example, are file types ("feature:file-type:java") and file names ("feature:file:AndroidManifest.xml"). The project context is then analyzed 706 and information about project files and file types is used to determine certain details to map the project context onto tasks in the knowledge database. In some examples:

IF File="Rakefile" and there are other associated .rb files THEN Ruby project
    IF File="AndroidManifest.xml" THEN Android project
    IF Lots of .java files THEN Java project
    IF Lots of .java files and web.xml THEN Java web project In an example, project dependencies are automatically examined for any clues about the project context. Project files can include, for example, dependencies, details from internal systems, code commit messages, code scanner findings, epics, stories, and bugs, all of which can be regarded as software context and contribute context data to the context set of the software asset. In one example, the script <scan.py--dir/project/path/--operation=analyze--dep=dependency-check-report.json> can be used to find the dependencies:

dep:stapler
    dep:http2-common
    dep:jetty-webapp
    dep:guava
    dep:commons-beanutils In another example, a meta analysis can extract meaning from words, such as by examining a project's git commit messages for any topic, or by examining a ticketing system for topics in an Epic, a set of stories or tasks, dependencies, details from internal systems, code commit messages, scanner findings, or bugs. For example, the script <scan.py--dir/project/path/--operation=analyze--tool_config=tool_config.json> can be used to find topics:

topic:PCI
    topic:PII
    topic:uses_password
    topic:uses_database

Predictions of additional software context can also be made using the identified software context. For example, a project source directory can be examined to determine which knowledge database tasks suit the context profile using the script <scan.py--dir/project/path--operation=predict--train_path=training/*.json> to find relevant knowledge tasks. An example results list can be returned, such as is shown in table 2:

TABLE 2

| Prediction | Confidence |
| --- | --- |
| answer:php | 0.00 |
| profile:Android | 0.75 |
| answer:ruby | 0.00 |
| answer:python | 0.00 |
| answer:Java | 0.91 |

The system can also be trained to detect new projects. One example training file for PHP projects could be:

```
[
  {
    "features": [
      "file:composer.json",
      "file-type:.php"
    ],
    "labels": [
      "answer:php",
      "profile:php"
    ]
  }
]
```

In this way the system can learn from existing projects, for example by querying using the script <scan.py--dir/project/path/--operation=learn--train_path=new_training.csv--project_id=2467>. In another example, the system can extract a requirements profile or set of related requirements with context and matching requirements from the knowledge database for an existing project. The context of the existing project can be extracted from its file, the dependencies and other sources identified, and the two sets of information combined to create a training set for future predictions of project requirements for projects with similar context profiles. The system can thereby automatically create projects using context <scan.py--dir/project/path/--operation=create_project--confidence=0.40--train_path=training/*.json>

Once the project has been created, the project is imported 708, and the project profile is then set 710. Additional details can be specified during the onboarding, such as additional results of project surveys, assignment of project membership, and configured integrations.

The present system can integrate with other application lifecycle management (ALM) tools which provide a work ticketing system to describe and prioritize developer work. In one embodiment, the requirements task list can also be exported as a single software development guidance document or ALM tool, such as Atlassian JIRAT™. In an ALM, the requirements task list can also be synchronized with the ALM tool to allow security stakeholders to push requirements within the ALM tool into a developer's workflow with prioritization, best practices, guidance and risk analysis required for a developer to implement it. The developer can continue to work inside the ALM tool and as work is completed, the present system can be kept up to date with the status of corresponding work and requirements. A two-way synchronization between the present system and an ALM tool therefore enables developers to communicate the priority and security work to team members in the system already implemented at a client site. An application programming interface (API) can also be used to build a custom client application which provides directed guidance and requirements particular to a client project portfolio. An API can give external programmatic access to the data and behaviours of the system such that queries and instructions can be made to the system and the user can be presented with an updated task list. The developer can also export the security requirements task list as a static electronic document as needed.

Although the present disclosure focuses on a system and method for automation of task identification for a single software asset, it is understood that an organization will have a plurality of software assets that would benefit from the same. Accordingly, multiple software assets within an organization can be subjected to task identification according to the presently described system and method regardless of the state of development of each asset in the software lifecycle, providing the organization with a view and prioritized task list for each software asset. Further, it would be fully understood that the organization could also merge the prioritized task lists for two or more software assets, and potentially include all software assets in the organization, to prioritize the work of individual developers, teams of developers, or of the organization as a whole. There are a multitude of ways that one or more merged or global task list can be further prioritized, including but not limited to, by priority of task, priority of software asset, project priority, or risk priority. This merged task list could also be dynamically updated based on risk of an individual software asset or other organization priority.

All publications, patents and patent applications mentioned in this specification are indicative of the level of skill of those skilled in the art to which this invention pertains and are herein incorporated by reference. The invention being thus described, it will be obvious that the same may be varied in many ways. Such variations are not to be regarded as a departure from the scope of the invention, and all such modifications as would be obvious to one skilled in the art are intended to be included within the scope of the following claims.

We claim:

1. A computer-implemented method for task identification for a software asset, the method comprising:
   in one or more processors, on an ongoing basis, extracting context data from a context repository of the software asset by scanning the context repository using one or more data scraping tool, the context data comprising technical and operational properties, and execution environment of the software asset;
   in the one or more processors, performing a meta analysis on the extracted context data to generate a context profile for the software asset, the context profile comprising system source and file structure data, a set of dependencies in use by the software asset, and at least one configuration file describing how the software asset should be configured;
   matching the context profile to relevant task requirements in a knowledge database comprising a plurality of task requirements accessible with a retrieval tool by matching the context profile and the extracted context data with corresponding tagged requirements in the knowledge database, each task requirement comprising task guidelines and actionable guidance to orchestrate software development and one or more tags delineating its relevance to a particular software context;
   selecting the task requirements specific to the software asset based on the context profile;
   generating a prioritized task list comprising the matched task requirements for the software asset;
   updating the prioritized task list throughout a software lifecycle when updates are made to the context repository or knowledge database that are relevant to the software asset and pushing the updates to the prioritized task list for ongoing software asset management; and
   presenting the prioritized task list on a user interface.

2. The method of claim 1, wherein the context data is stored in at least one configuration management repository.

3. The method of claim 1, wherein generating the prioritized task list is based on a security risk of each of the selected task requirements.

4. The method of claim 1, wherein tasks that are identified as susceptible to security risk are automatically escalated on the task list.

5. The method of claim 1, wherein the at least one configuration file comprises one or more of:
   details to initialize the software asset;
   instructions for how the software asset should behave; and
   information to support deployment of the software asset.

6. The method of claim 1, wherein the at least one configuration file comprises at least one of what libraries should be installed, web server configuration, firewall rules, user access rules, and network access details.

7. The method of claim 1, wherein operational properties of the software asset comprise resource constraints of the software asset.

8. The method of claim 7, wherein the resource constraints comprise at least one of processor speed, memory, disk space, and network bandwidth.

9. The method of claim 1, wherein the context repository is a system of record.

10. The method of claim 1, wherein the context repository comprises one or more of specification of a physical server where the software asset is stored, which licenses are required to use a third party tool, a fact-based description of the software asset, and where the software asset will be or is deployed.

11. The method of claim 1, wherein the context data is stored in a test plan for validating functional or non-functional behaviors of the software asset.

12. The method of claim 11, wherein the test plan is in one or more of natural language and in a computer-readable format.

13. The method of claim 11, wherein the test plan includes one or more unit tests, full stack tests, regression tests, smoke tests, and performance tests.

14. The method of claim 1, wherein the context data is gleaned from one or more of a system of record, source code, software specification, epic system, dependency management system, project management software, business management software, source code management (SCM) system, configuration management system, application lifecycle management system, test plan, and dependency library.

15. A computerized system for task identification for a software asset, the computerized system comprising:
   a computer system comprising at least one processor, at least one memory device, and at least one network communication device; and
   a context extraction engine stored in the at least one memory device comprising computer readable instructions, that when executed by the at least one processor cause the at least one processor to:
   on an ongoing basis, extract context data from a context repository of the software asset by scanning the context repository using one or more data scraping tool, the context data comprising technical and operational properties, and execution environment of the software asset;
   perform a meta analysis on the extracted context data to generate a context profile for the software asset, the context profile comprising system source and file structure data, a set of dependencies in use by the software asset, and at least one configuration file describing how the software asset should be configured;
   match the context profile to relevant task requirements in a knowledge database comprising a plurality of task requirements accessible with a retrieval tool by matching the context profile and the extracted context data with corresponding tagged requirements in the knowledge database, each task requirement comprising task guidelines and actionable guidance to orchestrate software development and one or more tags delineating its relevance to a particular software context;
   select the task requirements specific to the software asset based on the context profile;
   generate a prioritized task list comprising the matched task requirements for the software asset;
   update the prioritized task list throughout a software lifecycle when updates are made to the context repository or knowledge database that are relevant to the software asset and pushing the updates to the prioritized task list for ongoing software asset management; and
   present the prioritized task list on a user interface.

16. The computerized system of claim 15, wherein the at least one configuration file comprises one or more of:
   details to initialize the software asset;
   instructions for how the software asset should behave; and
   information to support deployment of the software asset.

17. The computerized system of claim 15, wherein the context repository comprises one or more of the specification of a physical server where the software assets is stored, which licenses are required to use a third party tool, a fact-based description of the software asset, and where the software will be or is deployed.

18. A method for automation of task identification for a software asset, the method comprising:
   in one or more processors, on an ongoing basis, extracting context data from a dynamic context repository of the software asset by scanning the context repository for the context data using a data scraping tool, the context data comprising technical and operational properties, running environment, and execution environment of the software asset;
   in the one or more processors, performing a meta analysis on the extracted context data to generate a context profile for the software asset, the context profile comprising system source and file structure data and a set of dependencies in use by the software asset;
   matching the extracted context data in the context profile to relevant task requirements in a knowledge database comprising a plurality of task requirements accessible with a retrieval tool by matching the context profile and the extracted context data with corresponding tagged requirements in the knowledge database, each task requirement comprising task guidelines and actionable guidance to orchestrate software development and one or more tags delineating its relevance to a particular software context;
   selecting the task requirements specific to the software asset based on the extracted context data;
   generating a prioritized task list comprising the matched task requirements for the software asset based on a security risk of each of the selected task requirements;
   updating the prioritized task list throughout a software lifecycle when updates are made to the dynamic context repository or knowledge database that are relevant to the software asset and pushing the updates to the prioritized task list for ongoing software asset management, wherein tasks that are identified as susceptible to security risk are automatically escalated on the task list; and
   presenting the prioritized task list on a user interface.

19. The method of claim 18, wherein performing a meta analysis on the extracted context data comprises identifying what linked libraries are used and identifying any vulnerabilities with any linked libraries.

20. The method of claim 18, further comprising scanning source code of the software asset using a code scanner to identify any code vulnerabilities.

* * * * *